United States Patent Office 2,773,815
Patented Dec. 11, 1956

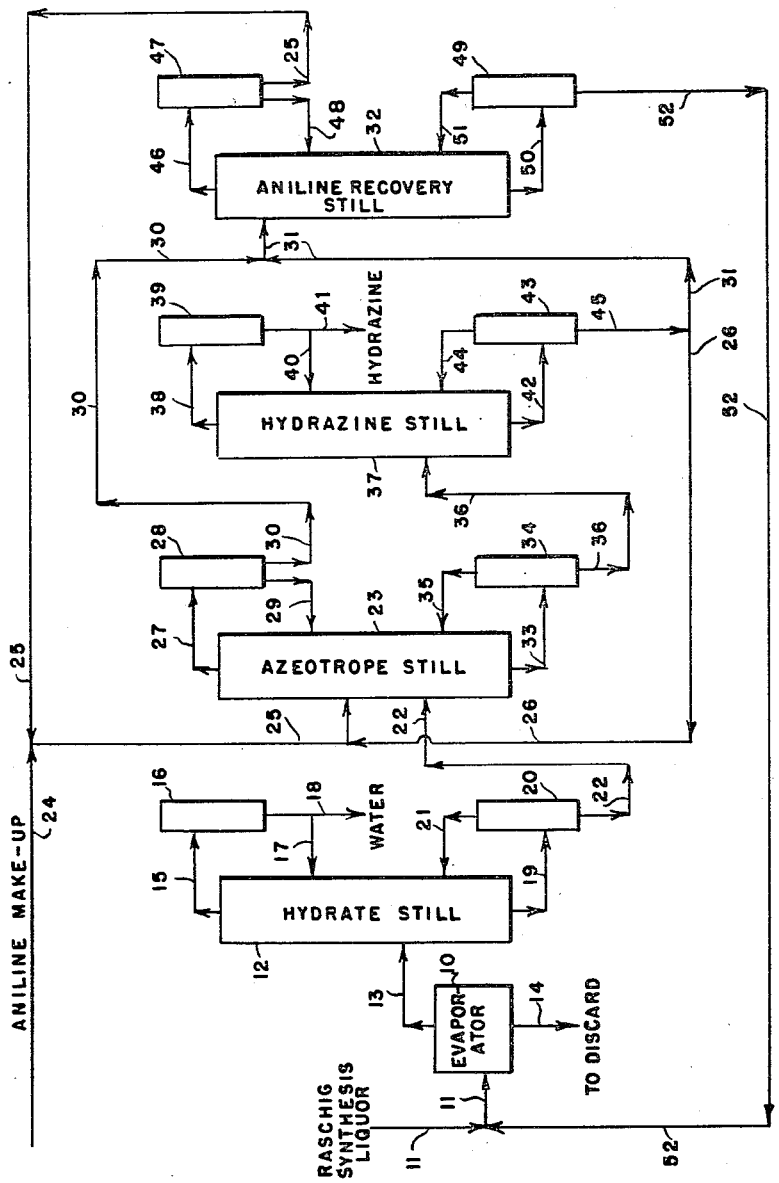

2,773,815

RECOVERY OF ANILINE ENTRAINER IN DEHYDRATION OF HYDRAZINE BY AZEOTROPIC DISTILLATION

Bernard H. Nicolaisen, Kenmore, N. Y., assignor to Olin Mathieson Chemical Corporation, a corporation of Virginia Application June 12, 1953, Serial No. 361,186

3 Claims. (Cl. 202—42)

My invention relates to an improvement in the process of manufacturing anhydrous hydrazine from dilute aqueous hydrazine solutions using aniline as an entraining agent for water in an azeotropic distillation. More particularly, it relates to the purification and reuse of aniline in such a process.

In recovering hydrazine from the Raschig synthesis liquor, the latter may, for example, be evaporated to separate volatile from non-volatile components. Generally, hydrazine, water and perhaps minor quantities of residual ammonia are volatilized into a hydrazine hydrate still. The residue from the evaporator, which is principally sodium chloride but which may contain minor proportions of other relatively non-volatile materials, for example, metallic corrosion products from the synthesis equipment, is usually discarded. In the hydrazine hydrate still, operating usually at atmospheric pressure, water is removed overhead and minor proportions of ammonia in the charge are eliminated with the water. The bottoms comprise aqueous hydrazine containing about 50 to about 70% of hydrazine, i. e., approximating the compositions of hydrazine monohydrate ($N_2H_4.H_2O$—64% $N_2H_4$) and the hydrazine-water azeotrope (71.5% $N_2H_4$).

In the utilization of aniline as an entraining agent in azeotropic distillation for the manufacture of a hydrazine product containing less water than the monohydrate or the hydrazine-water azeotrope, one particularly advantageous mode of operation is that described in my pending application Serial No. 361,185 filed June 12, 1953. In that process, hydrazine hydrate, the hydrazine-water azeotrope or aqueous hydrazine solutions containing about 50 to about 70% hydrazine, i. e., a hydrazine to water mole ratio in the range of about 0.5:1 to about 2:1, such as produced in the hydrate still, is charged to an azeotrope still with recycle and make-up aniline in such proportions to provide an aniline to hydrazine mole ratio in the feed to the azeotrope still in the range of about 3:1 to about 12:1 and preferably about 7:1. A portion of the aniline charged and substantially all of the water charged to the azeotrope still pass overhead from this still as an aniline-water azeotrope which is condensed and a portion returned to the azeotrope still as reflux at a reflux ratio of the order of 5:1, i. e., 5 parts of condensed azeotrope are returned to the azeotrope still as reflux for each part of azeotrope withdrawn from the distillation. The dehydrated aniline-hydrazine bottoms of the azeotrope still are charged to a hydrazine still to separate substantially anhydrous hydrazine as an overhead product. Almost all of the aniline charged to the hydrazine still and 1 to 10% of hydrazine, depending upon the operation of the hydrazine still, is removed as bottoms from this still through a reboiler and recycled to the azeotrope still. However, a minor amount of aniline may be carried overhead with the anhydrous hydrazine from the hydrazine still, and this aniline can be removed from such an aniline-contaminated anhydrous hydrazine product by solvent extraction with a selective hydrocarbon solvent for aniline as described in my pending application Serial No. 361,184, filed June 12, 1953.

In an azeotropic distillation system employing aniline as entraining agent for water such as is described in my application Serial No. 361,185, any salt carried over from the Raschig synthesis liquor and any other non-volatile impurities derived from the materials of construction of the system or other sources will pass as bottoms through each of the hydrate still, the azeotrope still and the hydrazine still and accumulate in the recycling aniline. The water phase separated from the aniline-water azeotrope passed overhead from the azeotrope still in such a system contains a minor amount of aniline and this aniline is lost if this water phase is discarded. In addition, imperfect operation of the azeotrope still may permit minor proportions of hydrazine to pass overhead from the azeotrope still with the aniline-water azeotrope and be lost with the discarded water phase separated from this azeotrope.

My process has been designed to integrate in an azeotropic distillation system an aniline recovery still for the distillation of aniline-water mixtures which contain non-volatile impurities and which may contain minor amounts of hydrazine to avoid the accumulation of non-volatile impurities in the aniline recycle stream of the system, to provide for the conservation of aniline, and to prevent any possible losses of hydrazine.

In the process of my invention, a minor portion of the aniline bottoms being recycled to the azeotrope still from the hydrazine still are diverted to an aniline recovery still in suitable proportions to maintain the concentration of these impurities in the aniline recycle stream below objectionable limits. The water phase separated from the aniline-water azeotrope taken overhead from the azeotrope still and which contains minor amounts of aniline also is charged to this aniline recovery still so that the feed to the aniline recovery still is made up of both the aniline, containing some non-volatile impurities, diverted from the aniline recycle stream and this water phase. In the aniline recovery still, the aniline and some water of the feed combine to form an aniline-water azeotrope which passes overhead from the aniline still. A portion of this overhead product, drawn chiefly from the water phase of the separated azeotrope, is returned to the aniline recovery still as reflux and the balance is recycled to the azeotrope still. The remainder of the water of the feed, the non-volatile impurities derived by entrainment from the evaporator or from corrosion of the distillation equipment or from other sources in the system, and any minor amounts of hydrazine that may be present form the still bottoms of the aniline recovery still and are passed to a reboiler, suitably heated with steam coils or the like, from which a portion of the bottoms are returned to the still as vapors to provide heat for the distillation. The remainder of these still bottoms are passed to an evaporator, advantageously the evaporator used to volatilize the volatile components of the Raschig synthesis liquor to provide suitable feed for the hydrate still, and in this evaporator the water and any hydrazine content are separated from the non-volatile impurities for return to the hydrate still. The aniline recovery still thereby provides a means for the recovery of any minor proportions of hydrazine carried overhead with the aniline-water azeotrope due to faulty operation of the azeotrope still.

In operation of the aniline recovery still in the process of my invention, it is important that the aniline recovery still produce an aniline-free bottoms product since any aniline passing to the evaporator with these bottoms would be charged to the hydrate still from the evaporator and would be lost if the overhead water from the hydrate still were discarded or would interfere with the Raschig hydrazine synthesis step if this overhead water of the hydrate still were returned to that process. For this reason, a bottom temperature of at least about 98° C. at atmospheric pressure should be maintained at the bottom of the aniline still.

The process of my invention will be illustrated by the following examples showing the operation of the aniline recovery still.

*Example I*

A mixture of 88.78% of water, 6.20% of hydrazine and 5.02% of aniline, simulating a mixed feed to the aniline recovery still which might be obtained from a combination of the aniline-water azeotrope taken overhead from the azeotrope still and a minor portion of the recycling aniline stream from the bottom of the hydrazine still, was charged to the 17th plate from the bottom of a 24-plate aniline recovery still. The bottom temperature was maintained at 115 to 117° C. at atmospheric pressure and this resulted in an overhead temperature of 95° C., using a reflux ratio of 2.2:1, i. e., 2.2 parts of the overhead aniline-water azeotrope were returned to the hydrazine still as reflux for each part of this overhead withdrawn from the distillation. The feed rate to the aniline recovery still in this example of the still operation was 2 gallons per hour. The overhead comprised about 80% of a water layer and 20% of an aniline layer, the former containing 4.29% of aniline and less than 0.1% of hydrazine. The aniline layer contained 6.72% of water and less than 0.1% of hydrazine. Thus substantially no hydrazine appeared in the overhead product. The bottoms comprised 53.61% of water, 46.28% of hydrazine and 0.11% of aniline. Any non-volatile contaminants such as salt or metallic particles are dissolved or suspended in these bottoms which are normally recycled to the Raschig synthesis liquid evaporator.

*Example II*

In a similar experiment the feed comprised 89.11% of water, 4.75% of aniline and 6.14% of hydrazine. Overhead water contained 4.61% of aniline and 0.01% of hydrazine. The overhead aniline contained 4.17% of water and 0.01% of hydrazine. The bottoms product comprised 53.61% of water, 46.39% of hydrazine and less than 0.1% of aniline.

The process of my invention in which an aniline recovery still is integrated in an azeotropic distillation system will be further described and illustrated by the description of the accompanying drawing which is a flow diagram of my process.

In the drawing, Raschig synthesis liquor is passed to evaporator 10 through line 11. From the evaporator 10, hydrazine and water vapors are passed to hydrate still 12 through line 13 and salt and other non-volatile impurities are passed from the evaporator 10 to discard through line 14. Water vapor is taken overhead from the hydrate still 12 through line 15 to a condenser 16 from which some of the condensed water is returned to the hydrate still 12 through line 17 as reflux and the remainder is passed through line 18 either to discard or to the Raschig hydrazine synthesis. A hydrazine-water mixture accumulates in the hydrate still 12 as bottoms and is discharged from the hydrate still 12 through line 19 to reboiler 20 which is suitably heated by steam coils or the like. A portion of these bottoms are returned as vapors to the hydrate still 12 from the reboiler 20 through line 21 to supply heat for the distillation.

The remainder of the hydrazine-water mixture in the reboiler 20 forms the charge for azeotropic distillation and is passed through line 22 to azeotrope still 23 as part of the feed to that still. Make-up aniline through line 24, recycle aniline from the aniline recovery still 32 through line 25, and recycle aniline from the hydrazine still bottoms in reboiler 43 through line 26 are passed to the azeotrope still 23 to provide the balance of the feed to that still. From the azeotrope still 23, an aniline-water azeotrope is taken overhead through line 27 to a condenser-separator 28 in which this azeotrope is first condensed and then separated into a water phase and an aniline phase, suitably by providing a separator of the baffled type in which the separator space is divided by baffles to force liquids of different densities to pass to different zones. A portion of this condensed azeotrope, is returned to the azeotrope still 23 as reflux through line 29. This reflux for the azeotrope still 23 is drawn from the aniline phase in the separator part of condenser-separator 28 plus whatever amount of the water phase may be necessary to provide the desired quantity of reflux. The balance of the condensed azeotrope is discharged from the condenser-separator 28 through lines 30 and 31 to aniline recovery still 32. A hydrazine-aniline mixture accumulates in azeotrope still 23 as bottoms and is passed through line 33 to reboiler 34 suitably heated by steam coils or the like. A portion of these bottoms are returned as vapors to azeotrope still 23 through line 35 to provide the necessary heat for distillation. The remainder of these bottoms are passed through line 36 to hydrazine still 37 as the feed material to this still.

In hydrazine still 37, substantially anhydrous hydrazine is distilled from the hydrazine-aniline mixture charged and passes overhead through line 38 to condenser 39 from which a portion is returned to the hyzadrine still 37 as reflux through line 40 and the remainder is withdrawn as the anhydrous hydrazine product through line 41. Any contaminating aniline in this anhydrous hydrazine product may be removed by solvent extraction as described in my application Serial No. 361,184.

The bottoms of the hydrazine still 37 comprising aniline, which may contain from 1 to 10% hydrazine depending upon the operation of the still, are withdrawn from the hydrazine still 37 through line 42 to reboiler 43 suitably heated by steam coils or the like. In reboiler 43, a portion of the aniline bottoms are vaporized and returned to the hydrazine still 37 through line 44 to provide the necessary heat for the distillation. The remainder of the aniline bottoms are discharged from reboiler 43 through line 45. The major portion of these aniline bottoms discharged from reboiler 43 is recycled to azeotrope still 23 through line 26 while a minor portion of these bottoms is diverted through line 31 and with the material removed from condenser-separator 28 through line 30 make up the feed to the aniline recovery still.

In the aniline recovery still 32, all of the aniline and a portion of the water contained in the feed are taken overhead as an aniline-water azeotrope through line 46 to a condenser-separator 47. The aniline-water azeotrope passing to the condenser-separator 47 is first condensed and then separated, suitably by providing a separator of the baffled type, into an aniline phase and a water phase. Some of the condensed azeotrope from condenser-separator 47 is returned to aniline recovery still 32 through line 48 as reflux and the balance is recycled to azeotrope still 23 through line 25. The reflux returned to aniline recovery still 32 is all of the water phase in the separator part of condenser-separator 47, and, if the quantity of water phase present is insufficient to provide the desired amount of reflux, a portion of the aniline phase is also used.

Condenser-separators 28 and 47 may be replaced by a common condenser-separator of sufficient size to handle the aniline-water azeotrope overhead both from the azeotrope still 23 and from the aniline recovery still 32. If such a common condenser-separator is employed, the water phase separated therein provides both a portion of the feed as well as the reflux for the aniline recovery still 32, and the aniline phase separated therein provides both a portion of the aniline feed as well as the reflux for the azeotrope still 23.

Almost completely aniline-free bottoms accumulate in the aniline recovery still 32 and are passed to reboiler 49 through line 50. Reboiler 49 is suitably heated by steam coils or the like and a portion of the bottoms in the reboiler 49 are returned to aniline recovery still 32 as vapors through line 51 to provide the necessary heat for the distillation. The remainder of the still bottoms in the reboiler 49 which are composed of water, any hydrazine and any non-volatile impurities present in the feed to the aniline recovery still 32, are passed to evaporator 10 through line 52 for removal of the non-volatile impurities and return of the water and hydrazine to the hydrate still 12.

I claim:

1. In the production of anhydrous hydrazine by the azetropic distillation of aqueous hydrazine solutions employing aniline as an entraining agent for water in which aniline and an aqueous solution of hydrazine are charged to a first still, an aniline-water azeotrope is removed overhead from this first still, the bottoms from the first still in the form of an aniline-hydrazine mixture are charged to a second still and substantially anhydrous hydrazine is removed overhead from this second still leaving aniline bottoms which are recycled to the first still; the improvement which comprises charging to a third still a minor portion of the aniline bottoms from the second still, distilling said minor portion in admixture with water, removing an aniline-water azeotrope overhead from this third still, passing this aniline-water azeotrope to the first still, and removing from the third still bottoms comprising water containing any non-volatile impurities charged to this third still.

2. In the production of anhydrous hydrazine by the azeotropic distillation of aqueous hydrazine solutions employing aniline as an entraining agent for water in which aniline and an aqueous solution of hydrazine are charged to a first still, an aniline-water azeotrope is removed overhead from this first still and the major portion of the aniline content and a portion of the water content of this azeotrope is returned to the first still as reflux, the bottoms from the first still in the form of an aniline-hydrazine mixture are charged to a second still and substantially anhydrous hydrazine is removed overhead from this second still leaving aniline bottoms which are recycled to the first still; the improvement which comprises charging to a third still a minor portion of the aniline bottoms from the second still and the balance of the azeotrope removed overhead from the first still, removing an aniline-water azeotrope overhead from this third still, refluxing a portion and passing the remainder of this aniline-water azeotrope to the first still, removing from the third still bottoms comprising water containing any non-volatile impurities charged to this third still, passing these bottoms to an evaporator for separation of volatile and non-volatile constituents, and passing volatile effluent from the evaporator to the first still.

3. In the production of anhydrous hydrazine by the azeotropic distillation of aqueous hydrazine solutions employing aniline as an entraining agent for water in which aniline and an aqueous solution of hydrazine are charged to a first still, an aniline-water azeotrope is removed overhead from this first still and the major portion of the aniline content and a portion of the water content of this azeotrope is returned to the first still as reflux, the bottoms from the first still in the form of an aniline-hydrazine mixture are charged to a second still and substantially anhydrous hydrazine is removed overhead from this second still leaving aniline bottoms which are recycled to the first still; the improvement which comprises charging to a third still a minor portion of the aniline bottoms from the second still and the balance of the azeotrope removed overhead from the first still, removing an aniline-water azeotrope overhead from this third still, refluxing a portion and passing the remainder of this aniline-water azeotrope to the first still, maintaining a bottoms temperature in the third still of at least about 98° C. at atmospheric pressure, removing from the third still substantially aniline-free bottoms comprising water containing any non-volatile impurities charged to this third still, passing these bottoms to an evaporator for separation of volatile and non-volatile constituents, and passing volatile effluent from the evaporator to the first still.

References Cited in the file of this patent

UNITED STATES PATENTS

| 1,603,851 | Lummers | Oct. 19, 1926 |
| 2,385,504 | Goulding | Sept. 25, 1945 |
| 2,537,791 | Schwarcz | Jan. 9, 1951 |

FOREIGN PATENTS

| 620,713 | Great Britain | Mar. 29, 1949 |
| 652,855 | Great Britain | May 2, 1951 |

OTHER REFERENCES

The Chemistry of Hydrazine by Audrieth and Ogg, 1951 (pages 42–53).